United States Patent [19]

McCowan

[11] Patent Number: 4,876,673
[45] Date of Patent: Oct. 24, 1989

[54] DISPLAY OF COMMON DEPTH POINT SEISMIC DATA WITH VELOCITY CORRECTION IN REAL TIME

[75] Inventor: Douglas W. McCowan, Colleyville, Tex.

[73] Assignee: Mobil Oil Corporation, New York, N.Y.

[21] Appl. No.: 145,015

[22] Filed: Jan. 19, 1988

[51] Int. Cl.4 .............................................. G01V 1/28
[52] U.S. Cl. ....................................... 367/68; 367/52; 364/421
[58] Field of Search ........................... 367/52, 68, 71; 364/421; 346/33 C

[56] References Cited

U.S. PATENT DOCUMENTS

| | | | |
|---|---|---|---|
| 3,882,446 | 5/1975 | Brittian et al. | 367/71 |
| 4,208,732 | 6/1980 | Ruehle | 367/42 |
| 4,209,854 | 6/1980 | Ruehle | 367/43 |
| 4,558,438 | 12/1985 | Jones et al. | 367/71 |
| 4,570,217 | 2/1986 | Allen et al. | 364/188 |
| 4,633,448 | 12/1986 | Koeijmans et al. | 367/72 |
| 4,663,743 | 5/1987 | Rampuria et al. | 367/68 |
| 4,685,070 | 8/1987 | Flinchbaugh | 364/522 |

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

An improved method and apparatus for processing seismic data records is disclosed. Data is normal moveout corrected by an operator providing estimates of velocity of seismic energy in rock layers in the earth. According to the invention, the system provides an immediate display of the seismic data processed in response to operator commands relating to estimated velocity, whereby the operator is permitted to perform normal moveout correction by inputting new velocity commands, essentially in real time.

9 Claims, 4 Drawing Sheets

PRIOR ART

DISPLAY OF COMMON DEPTH POINT SEISMIC DATA WITH VELOCITY CORRECTION IN REAL TIME

FIELD OF THE INVENTION

This invention relates to a method of display of common depth point seismic exploration data in which correction for varying velocity of the seismic energy through the layers of the earth can be made in real time.

BACKGROUND OF THE INVENTION

In seismic exploration of the earth, seismic energy is imparted to the surface of the earth at a "shotpoint". The seismic energy can be generated by detonation of a charge of explosives or vibration of a heavy object on the surface of the earth, or otherwise. In either case, the seismic energy is transmitted into the earth and is reflected upwardly towards the surface at interfaces between varying rock layers. The reflected seismic energy reaches the surface, and is detected there by a "spread" of geophones, that is, a number of microphones coupled to the earth and outputting a signal responsive to seismic energy passing thereby. Typically, the spread of geophones will be aligned along an exploration line extending from the shotpoint in a particular direction. After recording of data with respect to a particular shotpoint, the source of seismic energy is moved some distance along the line, and the process is repeated. The same process can be carried out in exploration of the seabed.

After exploration of a particular line of data is completed, data relating to energy from a plurality of shotpoints $SP_1 \ldots SP_n$ will have been recorded with respect to a plurality of geophones located at varying distances $X_1, X_2 \ldots X_n$ from the shotpoint. The data is then reorganized to collect records from data transmitted at various shotpoints and recorded at various geophone locations selected such that the reflection can be assumed to have been from a particular interface within the earth of interest, that is, from a "common depth point". The individual records or "traces" are then corrected for the differing distance the seismic energy travels through the earth from the corresponding shotpoints, to the common depth point, and upwardly to the various geophones. This step includes correction for varying seismic velocities through rock layers of different types. The correction for the varying spacing of the shotpoint-detection pairs is referred to as "normal moveout" correction. After this is done, the signals are then summed. Since noise in these records is typically uncorrelated, while the seismic signals are of sinusoidal character, the summation process serves to reduce noise in the seismic record by increasing its signal-to-noise ratio.

This well-known process is referred to as the "stacking" of common depth point "traces", and is discussed in detail in U.S. Pat. Nos. 4,208,732 and 4,209,854 to William H. Ruehle, among others, which two patents are incorporated herein by reference.

As discussed in the Ruehle patents, when the seismic traces from a common depth point are displayed on a single record, individual "events", that is, deflections in the traces caused by reflection of the seismic energy from interfaces between rock layers, tend to fall along hyperbolic curves. The curves are due to the variations in travel time of the seismic energy between varying shotpoints, the common depth point, and the particular geophones. The shape of these hyperbolic curves is essentially a function of the varying spacing of the shotpoints and detectors and of the velocity of the seismic waves in the rock layers. The hyperbolic curves are known as "normal moveout" curves.

In order that the signals from a particular common depth point can be "stacked", i.e. summed to reduce noise, so-called normal moveout correction is performed. In this process, which is well known to those of skill in the art, certain assumptions are made concerning the velocity of the seismic waves within the various rock layers and the thickness of the layer, and the traces recorded with respect to each of the geophone/shotpoint pairs are recomputed to compensate them accordingly. That is, the ray path which would have been taken by the energy if these assumptions were correct is calculated. The normal moveout correction thus takes into account the relative geometric locations of the shotpoint, the common depth point and the geophone, to determine the distance each wave travels, and then employs the velocity assumptions to calculate the actual travel time. This is then used to recompute all of the traces relating to a common depth point, such that they can be summed.

If the assumptions are made correctly, the hyperbolic curve relating to each individual event in the seismic record disappears and is replaced with a straight line. The recorded signals can then be "stacked" as described above to increase the signal-to-noise ratio of the data.

Conventionally, initial assumptions concerning the velocity of the wave in the subsurface layers and the thicknesses of the layers are made by operators on the basis of experience. In some cases, sample portions of the traces may be displayed after computation using a number of possible velocities; the operator can choose the velocities employed in computation of the sample record having the best appearance as a starting point. In either case, after the initial assumptions concerning the velocity have been made, the traces are recomputed accordingly, stacked and displayed. The operator can then determine whether, in fact, the hyperbolic curve has been reformed in favor of a straight line or not. The velocity estimates are then updated accordingly, and the data is recomputed and redisplayed.

This process may be iterated several times before the appearance of the data is adequate, that is, before the velocities are determined correctly.

It will be appreciated that to recompute the data using new velocity assumptions and redisplay it involves an enormous amount of computation. A single data record, relating for example to data recorded with respect to fifty common depth points, fifty shotpoints, and recorded by two hundred geophones to be handled together, may include a million data points, each recorded as four bytes of data. Accordingly, the data processing burden of such operations is immense. Conventionally the process of recalculating the data, recomputing the stack and displaying it takes on the order of hours or even days in busy seismic data processing installations. This process may take place with respect to four or five iterations each of literally dozens of sets of individual common depth points along one of many such lines in a typical exploration sequence. It is easy to see that the entire process of velocity selection and the normal moveout correction process, while nominally quite straight-forward, in practice is extremely tiresome and time consuming, and accordingly very costly.

Typically, normal moveout correction processing has been carried out using a mainframe computer to connect the various elements of the data processing system; these elements include separate devices for data storage, for operator input, for computation and for display of the normal moveout corrected data, all linked by way of the mainframe, which handles all communication and other interface functions between the various devices. The mainframe would itself perform the recomputation and stacking of the data in response to the velocity commands input by the operator.

In more modern installations, the actual recomputation and stacking of the data is performed by an "array processor", that is, a specialized computational device which is operated in accordance with commands received from a program running on the mainframe computer, which in turn translates the operator's commands into actual data processing instructions for the array processor.

In either case, the mainframe controls flow of data and commands between the various elements of the system. In particular, if an array processor is used, the recomputed data provided by the array processor is sent to the display or printing or plotting device by way of the mainframe. The mainframe thus controls the display operation, and in particular, must buffer the recomputed data, in order to supply it to the display device in the proper sequence. In this arrangement the mainframe must handle the data flow both to and from the array processor and also to the display, printing or plotting device. All of these operations are very time consuming, since there is an enormous amount of data which must be so handled. This amounts to a computational bottle neck in the display process, wherein other demands on the mainframe's time tend to interfere with smooth flow of data.

OBJECTS OF THE INVENTION

It is, therefore, an object of the invention to provide an improved method for performing normal moveout correction on seismic data, wherein the time consumed in such operations is vastly reduced.

According to a principal object of the present invention, the normal moveout correction process is to be performed essentially in real time, such that the operator can make velocity assumptions and see the recomputed data displayed substantially instantaneously, and can immediately make further assumptions as necessary, thus completing the entire process in a matter of minutes as compared to the hours or days required previously.

SUMMARY OF THE INVENTION

The objects of the invention and needs of the art outlined above are met by the present invention, which provides a new configuration of computational hardware for performing normal moveout correction, and an improved method for its use.

According to the present invention, the mainframe again supplies the raw data from a storage device to an array processor, together with operator input from a console. However, from that point the mainframe no longer handles or stores the data. Instead the recomputed data is sent by the array processor to a frame buffer, which comprises a large capacity solid state memory device, which in turn is connected directly to the display device. The mainframe only transmits the operator commands to the array processor, a very easy and quickly performed task. The computational speed and efficiency of this arrangement is such that normal moveout computations typically taking on the order of hours on preexisting systems now can be performed and the results displayed in on the order of fractions of seconds, such that as the operator inputs new velocity commands, the display changes almost instantaneously.

In fact, according to the invention, the operator can repetitively press a button on the console, gradually stepping the velocity chosen for a particular portion of the seismic record through a range of values, and can simultaneously watch the portion of the data relating to a particular event in the seismic record gradually move from a hyperbolic shape to a straight line. The operator's eye thus becomes the determining factor in noting when the straight line shape is accurately achieved. This represents a very substantial improvement not only in processing speed per se but also in accuracy of results, since the operator thus becomes an interactive part of the computational process itself.

BRIEF DESCRIPTION OF THE DRAWINGS

The invention will be better understood if reference is made to the accompanying drawings, in which.

DESCRIPTION OF THE PREFERRED EMBODIMENTS

Figure 1:
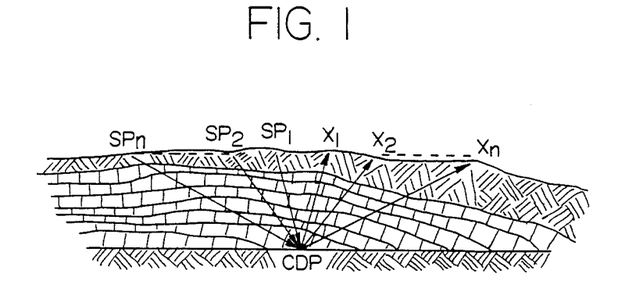
FIG. 1 illustrates schematically the seismic exploration process for data from a common depth point.
Figure 2:
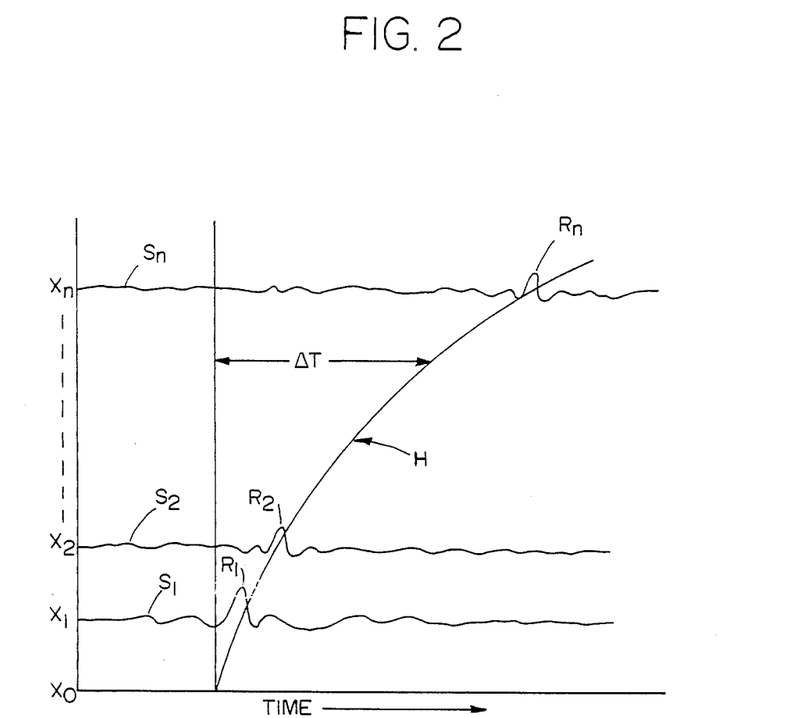
FIG. 2 shows a suite of seismic traces recorded with respect to a common depth point, and illustrates the typical hyperbolic normal moveout curve.

FIG. 1 shows schematically a conventional seismic exploration process, which yields a plurality of records of seismic energy all having been reflected from a single point at an interface between rock layers and within the earth, that is, from a common depth point (CDP). Over the course of an exploration, seismic energy is imparted to the earth at a plurality of shotpoints $SP_1, SP_2 \ldots SP_n$. Seismic energy travels into the earth and is reflected at interfaces between various rock layers 10, 12, 14. The data is recorded at a number of geophone locations $X_1, X_2 \ldots X_n$ located along an exploration line on the surface of the earth. When the data has all been collected, it is reordered such that all the data reflected from a common depth point at a particular interface (i.e. from a variety of geophone/shotpoint pairs) is together. This data may be displayed as shown in FIG. 2, in which the ordinate represents the horizontal spacing between the geophones at particular locations $X_1, X_2 \ldots X_n$ from a central location $X_0$, and the abscissa represents time, where the origin is the time of the "shot", at which the seismic energy is imparted to the earth. "Time" thus represents the distance of travel of the energy through interface within the earth. The seismic traces $S_1, S_2 \ldots S_n$ shown are recorded with respect to each of the geophones at spacings $X_1, X_2 \ldots X_n$. When they are displayed as shown in FIG. 2, events $R_1, R_2 \ldots R_n$, that is, peaks in the signals $S_1, S_2 \ldots S_n$ which correspond to reflection of the signal from a particular common depth point, tend to line up along a hyperbolic curve H as indicated. The time $\Delta T$, referred as the time shift between the curve H and a base-line indicating the time at which reflection from the common depth point is received at the origin $X_0$, is referred to as the normal moveout time.

Curve H represents the arrival time from trace to trace of each of the reflection signals $R_1, R_2 \ldots R_n$ in the suite of traces. The distance $\Delta T$ of the curve H at any point $X_n$ is a function of the distance between the geophone and the common depth point and the common depth point and the shotpoint, and of the velocity of the seismic energy through the rock layers. Curve H is specified by the hyperbolic function:

$$T_x = (T_0^2 + X^2/V^2)^{\frac{1}{2}}$$

where $T_x$ is the time of the reflection of a particular seismic trace;

$T_0$ is the time of that reflection on an idealized seismic trace with a reflection point directly under the shotpoints;

X is the horizontal distance between the shotpoint and the receiver producing the particular seismic trace; and V is the acoustic velocity characteristic of the layer through which the seismic energy travels.

The time shift from trace to trace of the reflections from the common depth point surface is commonly known as normal moveout and is specified by the function:

$$\Delta T = T_0 - (T_0^2 + X^2/V^2)^{\frac{1}{2}}$$

Reference is made to SEISMIC PROSPECTING FOR OIL by C. Hewitt Dix, 1952, Section 8.2.3, pp 134–137, for a further description of normal moveout determination.

In order that the seismic traces $S_1, S_2 \ldots S_n$ can be corrected for normal moveout and stacked to enhance their seismic signal-to-noise ratio, assumptions must be made about the velocity of the seismic energy in and the thickness of each of the rock layers 10, 12, 14 in the earth, and the signal appropriately corrected. As indicated above, this is normally done by making a set of initial assumptions, recomputing and displaying the data, and visually inspecting it to see if the curve H has been straightened from its initial hyperbolic form. If, as is commonly the case, this did not occur upon recalculation according to the initial assumption, the velocity and thickness assumptions are refined and the process repeated until satisfactory results are achieved. Normally, processing of the seismic traces to yield such a display is done as a batch job on a computer. That is, the operator inputs the desired new parameters, causes the job to take its place in a queue of such jobs, and receives the output sometime later. The process is then repeated.

Seismic data processing systems are conventionally operated such that several hours or even a day or two may be consumed between iterations of this process, such that the normal moveout correction process is very time consuming and tedious. Moreover, this tedium tends to lead to imperfect results; when the line becomes reasonably straight, the operator naturally tends to accept the result rather than refine it still more subtly, to lead to further improved results. The cumbersome nature of the process makes it natural to forego perfection in favor of expedition.

Figure 3:
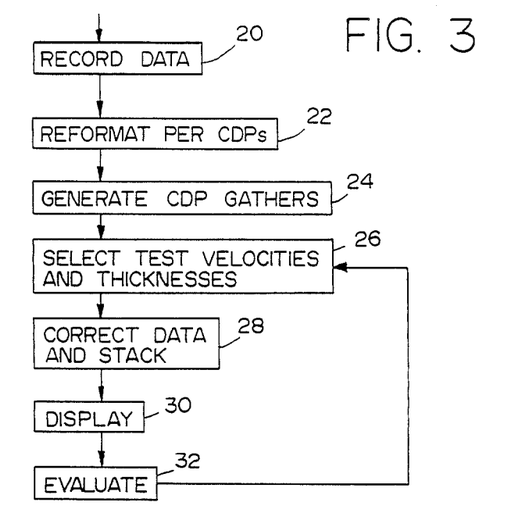
FIG. 3 shows the steps in normal moveout correction and stacking of common depth point records which are performed both conventionally and according to the invention.

The process of normal moveout correction is shown schematically in FIG. 3. The process begins at 20 with recordation of the data from a particular set of shotpoints at a plurality of geophones. When all the data has been recorded, the data is reformatted at step 22 such that the data being treated corresponds to seismic energy reflected from a particular common depth point. Common depth point "gathers" are then generated at 24; this refers to the step of displaying the data as shown in FIG. 2. Test velocities and layer thicknesses are then selected as indicated at step 26.

This step can be performed in a variety of ways. Perhaps most commonly, the operator simply selects initial velocities based on his or her experience in the formation of interest and the like. Alternatively, a plot can be prepared, employing a wide variety of possible velocities e.g. 1,500 m/sec., 1,700 m/sec., 1,900 m/sec. and so on, in each case displaying the same small portion of the seismic data gathered. The operator can select the initial velocities from such a plot, that is, selecting those which most nearly provide at least partially straight line paths for some portion of the seismic record.

Figure 4:
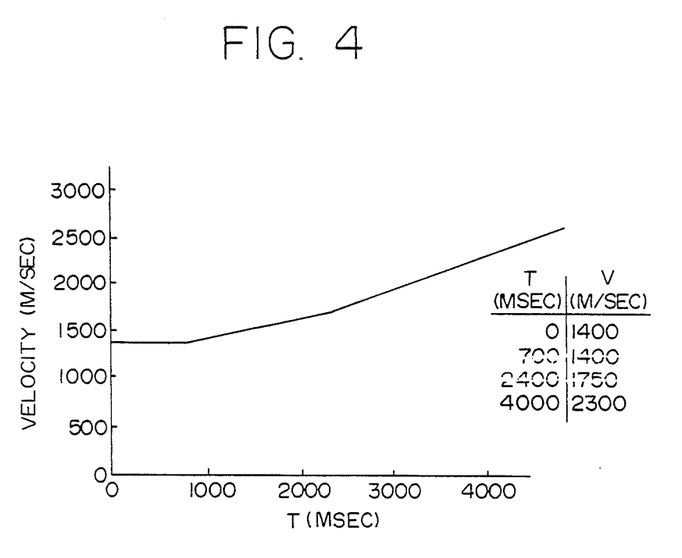
FIG. 4 shows a graph depicting typical assumptions made for the velocity of seismic energy in the earth as a function of depth in the earth, depicted as a function of time after the shot, and displays the data shown therein in tabular form as well.

The operator typically also selects the points between which the particular velocity is to apply, that is, makes initial assumptions concerning the thickness of the layers and thus the depth of the interfaces within the earth. For example, a plot of typical velocity assumptions versus time (that is, depth within the "section") is shown in FIG. 4. The initial velocity assumption made is that the seismic energy enters the earth at a velocity of 1,400 m/sec. and that this continues for approximately 700 milliseconds, that is to a depth of approximately 980 meters. (The data shown in the graph of FIG. 4 is repeated in tabular form at the right side of FIG. 4 for convenience). The assumption is then made that the velocity rises linearly from 1,400 m/sec. to 1,750 m/sec. over a depth corresponding to a travel time of 1,700 milliseconds. The rate of change of velocity is then assumed to change again, such that at 4,000 milliseconds depth the velocity of the wave has reached a value of 2,300 m/sec. As indicated by the straight line segments shown in the graph portion of FIG. 4, the velocity is assumed to change linearly between the inflection points corresponding to the different layers of rock. This linear increase in velocity corresponds to gradual compaction of the rock layers deeper and deeper within the earth.

Returning to discussion of FIG. 3, when a velocity profile assumption has been generated as shown in FIG. 4, these test velocities and thicknesses are input to the system running the CDP stacking program as indicated in step 26. The data is then corrected accordingly and the data stacked as indicated at step 28. As noted, this "normal moveout" correction process is conventional and well known to those skilled in the art. The data is then displayed at 30 in one of several generally conventional formats, and the displayed data can be evaluated at 32. Typically, the hyperbolic shape of events in the data, as shown by curve H of FIG. 2, will not have not straightened completely at this point, such that new test velocities are selected and steps 26, 28, 30 and 32 repeated until the results are deemed acceptable. New thickness estimates may also be made; normally the correct thicknesses of the layers are more readily settled upon than are the velocities.

As indicated above, this multiple-iteration process of selecting the seismic velocities corresponding to each of the layers is conventionally very time consuming, particularly because several hours may be typically involved between successive evaluation steps. This leads both to high cost of the process and prevents the operators from seeing the results of the selection of velocities directly. According to the present invention, an essentially similar process is carried out substantially in real time, so that the operator's input of the velocity assumptions in step 26 is followed substantially immediately by the display and evaluation steps. The operator is thus able to readily repeat the process as desired, until satisfactory results are achieved.

Figure 5:
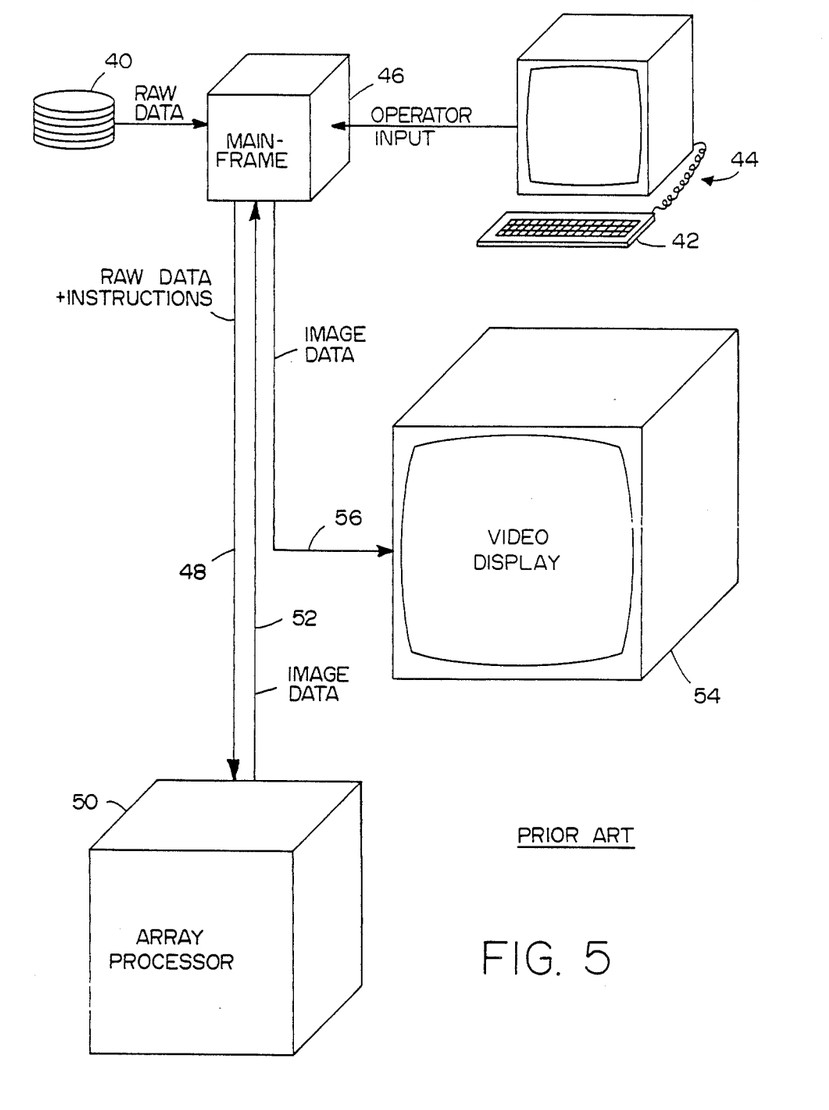
FIG. 5 shows schematically the elements in a conventional normal moveout correction processing and display system.

FIG. 5 shows a conventional hardware system for performing normal moveout correction and display of seismic data as indicated above. The raw data after having been reformatted in a step such as step 22 is stored on a magnetic storage means indicated generally at 40. Operator commands, input by way of a keyboard 42 of a terminal 44 are used by a mainframe computer 46 to access the magnetic storage device 40 and select raw data for analysis. The raw data and the operator's instructions for analysis may be processed by the mainframe 46 directly, but in a more sophisticated system they will be passed, as indicated at 48, by the mainframe 46 to an array processor 50. The array processor 50 is a known element of computer hardware which is optimized for performing large numbers of generally similar computations in efficient fashion. Where the mainframe computer 46 is a VAX computer sold by the Digital Equipment Corporation, the array processor 50 may be the model FPS AP120B system sold by the Floating Point Systems Company of Beaverton, Oreg.

When the array processor 50 has calculated the new data, that is, has corrected the raw data in accordance with the velocity assumptions input by the operator and stacked the common depth point data accordingly, it resupplies the image data, i.e., a display of the data organized corresponding to FIG. 2, to the mainframe 46, as indicated at 52. The mainframe then 46 may buffer and supply this image data to a video display unit 54 for displaying on a screen, as indicated at 56. More typically, due to the relative slowness of the conventional processing methods, the data may be printed using a conventional plotting unit for analysis by the operator. The operator then examines whether the reflection events $R_1, R_2 \ldots R_n$ (FIG. 2) have lined up as desired; if not, as is generally the case, new assumptions concerning the velocities are input and the process repeated.

As indicated in FIG. 5, in the conventional process the mainframe 46 handles the flow of data between the memory device 40 and the array processor 50, receives the processed data from array processor 50, may optionally buffer it, and then forwards it to the video display unit 54. In each case, the operation of the mainframe is impeded by demands on its time and the like, all of which tends to slow down the data handling process quite substantially. In particular, conventional mainframes 46 do not have enough memory available to store the complete image (which may comprise over a megabyte of data for a single 1,024×1,024 picture element display, as conventionally used), such that simply displaying the data on the video display unit 54 takes some substantial amount of mainframe time and requires multiple memory access operations. In effect, as can be seen from FIG. 5, the presence of the mainframe 46 in the data flow pathway between the array processor 50 and the video display 54 represents a very substantial bottleneck to normal moveout processing of seismic data.

Figure 6:
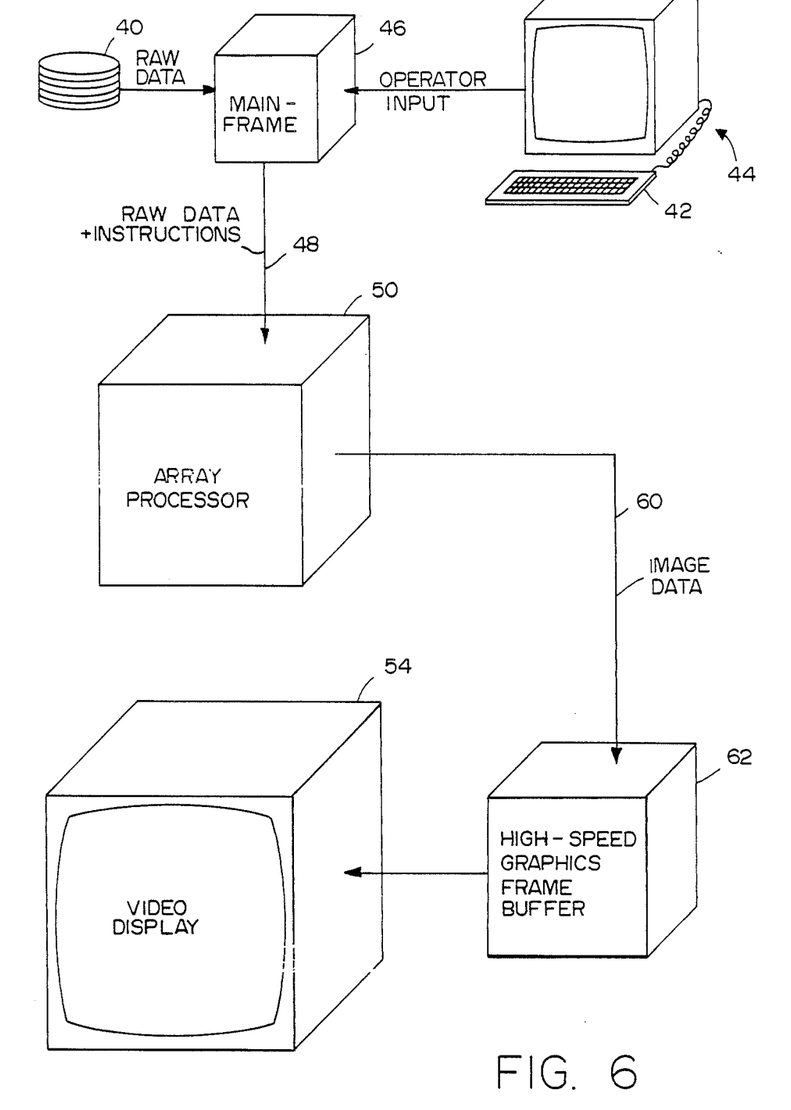
FIG. 6 shows the arrangement of the normal moveout correction processing and display system according to the present invention.

The hardware used according to the present invention is shown in FIG. 6. Once again, raw data is supplied from a storage device 40 to a mainframe computer 46, which also receives operator commands from a console unit 44 comprising a keyboard 42 or another operator input device such as a "mouse", a light pen, or the like. Again, the raw data and instructions are passed from the mainframe 46 to an array processor 50 via a line indicated generally at 48. However, in this case, the processed and stacked image data output by the array processor 50 is not returned to the mainframe 46, but instead is sent via a line 60 to a high speed graphics frame buffer unit 62. In essence the high speed graphics frame buffer comprises a solid state memory device capable of storing an entire "frame" of image data, that is, to provide all data needed for the video display. In a preferred embodiment of the invention, the high speed graphics frame buffer 62 may comprise a SAM-800 mass memory system provided by Texas Memory Systems, Inc. of Houston, Tex. The high speed graphics frame buffer 62 then simply feeds the data to the video display unit 54, which is identical to that used in connection with the conventional system of FIG. 5. It might also be possible to incorporate the frame buffer capability in the array processor 50.

The substantial advantage is provided by the inventive hardware arrangement shown in FIG. 6 can now be discussed. In particular, according to the invention a direct link is provided between the array processor and the video display 54, via the high speed graphics frame buffer 63. By removing the mainframe 46 from this data path, and avoiding the use of the mainframe for recomputing the data and driving the video display, the use of the mainframe in the normal moveout computation process is limited simply to translating the operator input commands into a form suitable for operation by the array processor.

More particularly, after the raw data has initially been supplied to the array processor via the mainframe, the mainframe does not have to control supply of data to and from the array processor; nor need the mainframe 46 control flow of image data between the array processor 50 and the video display 54. Instead, once the raw data has been initially supplied from the memory device 40 to the array processor 50, the mainframe 46 need simply forward the new operator commands. This is a very easy task to perform, involving little or no computation, which can be performed substantially in real time without interference from other tasks which may be running on the mainframe 46 simultaneously.

The practical effect of use of the system shown in FIG. 6 for normal moveout correction is that the operator can see the data displayed on the video display, and can enter one or more new velocity (or thickness) commands, as shown in tabular form in FIG. 4. The traces are immediately recomputed, stacked, and displayed, so that the operator can immediately see the effects of these new assumptions. Without taking his eye from the video screen, he can then simply repetitively press a single button on the keyboard (or access the system using a light pen, a mouse or the like) and indicate a new command reflecting a new assumption. These new commands are then supplied immediately to the array processor which then immediately recomputes the data and supplies it to the frame buffer for display on the video display unit.

In effect, the operator can input new velocity assumptions at a rate of two to four commands per second, depending on the particular system selected, and can see the display updated at those rates. This provides a very substantial improvement, in that the operator can observe the change of the hyperbolic curve to a straight line. He can easily determine if the curve moves beyond a straight line, and reverse a command if need be. The operator can also detect when a hyperbolic curve does not become a straight line in response to a set of assumptions; this may indicate that in fact the velocity decreases in that particular area of the formation, rather than increases.

In either case, very substantial improvements in accuracy are provided in that the operator is an integral part of the normal moveout computation system; that is, as the hyperbolic curve becomes more and more straight, the operator's eye enables him to see exactly when it becomes straight. This is not always possible using a limited number of individual displays generated on the order of hours apart. Even using a set of printouts it becomes very difficult to select exactly the correct point at which the "best" velocity assumption is apparent.

According to the invention, therefore, a real improvement in the ultimately produced record is realized by performing the processing in real time and allowing the operator's "eye" to help evaluate the correctness of the velocity assumptions made.

While a preferred embodiment of the invention has been described, it will be recognized by those of skill in the art that further improvements can be made thereto, and accordingly that the invention should not be limited by the above exemplary disclosure but only by the following claims.

I claim:

1. Apparatus for processing stored seismic data in accordance with the commands of an operator, and updating a display of said processed data essentially in real time, comprising:
    means for storing raw data received from seismic exploration operations;
    a mainframe computer, comprising means for accepting operator commands and means for receiving data from said means for storing raw data and transmitting said raw data together with said operator commands to an array processor means;
    an array processor means, for receiving said commands and said raw data from said mainframe computer means, and for processing said data in accordance with said operator commands; and
    video display means for receiving said data directly from said array processor and for displaying the same, wherein said data is reprocessed by said array processor and redisplayed on said display means substantially instantaneously in response to the commands provided by said operator, whereby the operator is permitted to observe the results of the input commands essentially in real time.

2. The apparatus of claim 1 further comprising a high speed graphics frame buffer connected between said array processor and said display unit for accepting said processed data from said array processor and storing the same in a form suitable for driving said video display responsive to said stored data.

3. The apparatus of claim 1 wherein said seismic data is common depth point seismic data selected from a plurality of seismic records, and wherein said operator commands relate to estimations of the velocity of seismic energy in and the thickness of differing layers of the earth's structure, and wherein said processing steps involve normal moveout correction of said seismic records responsive to said estimates of the velocity of seismic energy in said layers within the earth and of the thicknesses of said layers.

4. A method for processing common depth point seismic data and for displaying the same responsive to operator commands, said displaying being performed substantially in real time responsive to receipt of said commands, comprising the steps of:
    storing raw data received from a seismic exploration operation in storage means;
    providing a mainframe computer means to receive operator commands according to which said data is to be processed, and for forwarding said commands together with said data to an array processor means;
    employing said array processor means to process the data in accordance with said received operator commands, and to provide the processed data directly to a video display unit for display;
    displaying the processed data on said display unit;
    accepting further operator commands in response to review by the operator of the display of the processed data responsive to earlier commands; and
    reperforming said employing, displaying, and accepting steps essentially instantaneously until the operator is satisfied with the display of the resulting processed data.

5. The method of claim 4 further comprising the additional step of storing the processed data generated by said array processor means in a high speed graphics frame buffer means prior to display thereof on the video display unit.

6. The method of claim 4 wherein said data is seismic data stored in connection with a seismic exploration operation carried out along a particular exploration line, and wherein said commands received from the operator concern estimates of the velocity of seismic energy in varying layers of structure within the earth, and of the thickness of said layers.

7. The method of claim 4 wherein said mainframe receives said further operator commands and supplies them to the array processor for employing them to reprocess the data.

8. A method of generating a depiction of the subterranean structure of the earth, comprising the steps of:
    performing seismic exploration operations at a location on the surface of the earth, in which seismic energy is transmitted downwardly into the earth at a first shotpoint location, and is reflected upwardly at interfaces between rock layers in the earth, and detecting and recording the reflected energy employing transducers located at a number of recording locations on the surface of the earth spaced from the shotpoint;

accepting operator commands indicative of initial assumptions concerning the velocity of seismic energy in the subterranean structure, and the shape and thickness of the various layers of rock in the subterranean structure;

performing normal movement correction on each of the signals recorded by each of the transducers at the recording locations, thereby making correction for travel time variations between the shotpoint and recording locations close to the shotpoint and locations further from the shotpoint;

displaying the corrected signals as traces corresponding to the signals recorded by each of the transducers, wherein the traces are ordered according to the relative positions of the corresponding transducers with respect to the shotpoint, and the display is of the amplitude of the corrected signals versus time of receipt of the signal;

accepting further operator commands regarding updated assumptions with respect to the velocity of seismic energy and the shape and thickness of the layers of rock in the subterranean structure; and repeating said performing and displaying steps essentially instantaneously in response to accepted further operator commands;

wherein said performing, displaying and accepting steps are performed on a computer system comprising:

a display device for displaying the corrected traces;

an array processor for performing said normal movement correction step, connected to said display device for supplying the corrected signals directly thereto for display; and a mainframe computer, comprising means for accepting said operator commands and for supplying the to said array processor means;

wherein the mainframe computer does not in any way control the display of the corrected traces on the display deice after performance of the normal movement correction step by the array processor, so that said display of said corrected traces is updated responsive to new operator commands substantially in real time.

9. The apparatus of claim 8 wherein said array process copies the traces to a high speed graphic frame buffer wherein the traces are stored prior to supply to the display device for display the traces to user.

* * * * *